US008475893B2

(12) United States Patent
Feinerman

(10) Patent No.: US 8,475,893 B2
(45) Date of Patent: Jul. 2, 2013

(54) VACUUM INSULATION PANEL

(75) Inventor: Alan Feinerman, Skokie, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 13/116,519

(22) Filed: May 26, 2011

(65) Prior Publication Data

US 2012/0058292 A1    Mar. 8, 2012

Related U.S. Application Data

(62) Division of application No. 11/724,445, filed on Mar. 15, 2007, now Pat. No. 7,968,159.

(60) Provisional application No. 60/743,485, filed on Mar. 15, 2006.

(51) Int. Cl.
*E06B 3/00* (2006.01)

(52) U.S. Cl.
USPC ................................. 428/34; 428/69

(58) Field of Classification Search
USPC    428/34, 68, 69, 72, 119; 29/897.32; 312/400, 312/401, 402, 403, 404, 405, 405.1, 406, 312/406.1, 406.2, 407, 407.1, 408, 409, 410
See application file for complete search history.

(56) References Cited

U.S. PATENT DOCUMENTS 7,968,159 B2 *   6/2011   Feinerman ...................... 428/34

* cited by examiner

*Primary Examiner* — Alicia Chevalier
*Assistant Examiner* — Walter Moore
(74) *Attorney, Agent, or Firm* — Robert J. Brill; Brill IP Law Office

(57) ABSTRACT

A vacuum insulation panel (VIP) in an example comprises first and second walls and a plurality of tensile elements. The first and second walls are structurally coupled to allow formation of a vacuum cavity between the first and second walls. The plurality of tensile elements structurally supports the first and second walls against external pressure contemporaneous with tension on the plurality of tensile elements. The plurality of tensile elements is located in the vacuum cavity between the first and second walls.

22 Claims, 6 Drawing Sheets

VACUUM INSULATION PANEL

BACKGROUND

Heat is transferred between regions by convection, conduction, and black body radiation. A container sufficiently evacuated, for example, below about $10^{-2}$ to $10^{-5}$ torr or about 1.3 to 0.0013 Pa, removes the convective element of heat transport and may be referred to as a thermos. A thermos is an insulating container. Preventing a low pressure container from collapsing may involve supporting an atmospheric pressure load of 14.7 pounds/in$^2$ or approximately 0.1 MPa on the exterior surfaces of the vacuum container. Vacuum insulation for walls has been created and may be referred to as a vacuum insulation panel (VIP). VIPs may use a relatively impermeable membrane to maintain the vacuum. The relatively and/or extremely thin walls of the VIP may be supported by, for example, perlite, mineral powder, mineral fiber, fiberglass, silica microspheres, or another poor thermal conductor.

DESCRIPTION OF THE DRAWINGS

Features of exemplary implementations of the invention will become apparent from the description, the claims, and the accompanying drawings in which:

DETAILED DESCRIPTION

Figure 1:
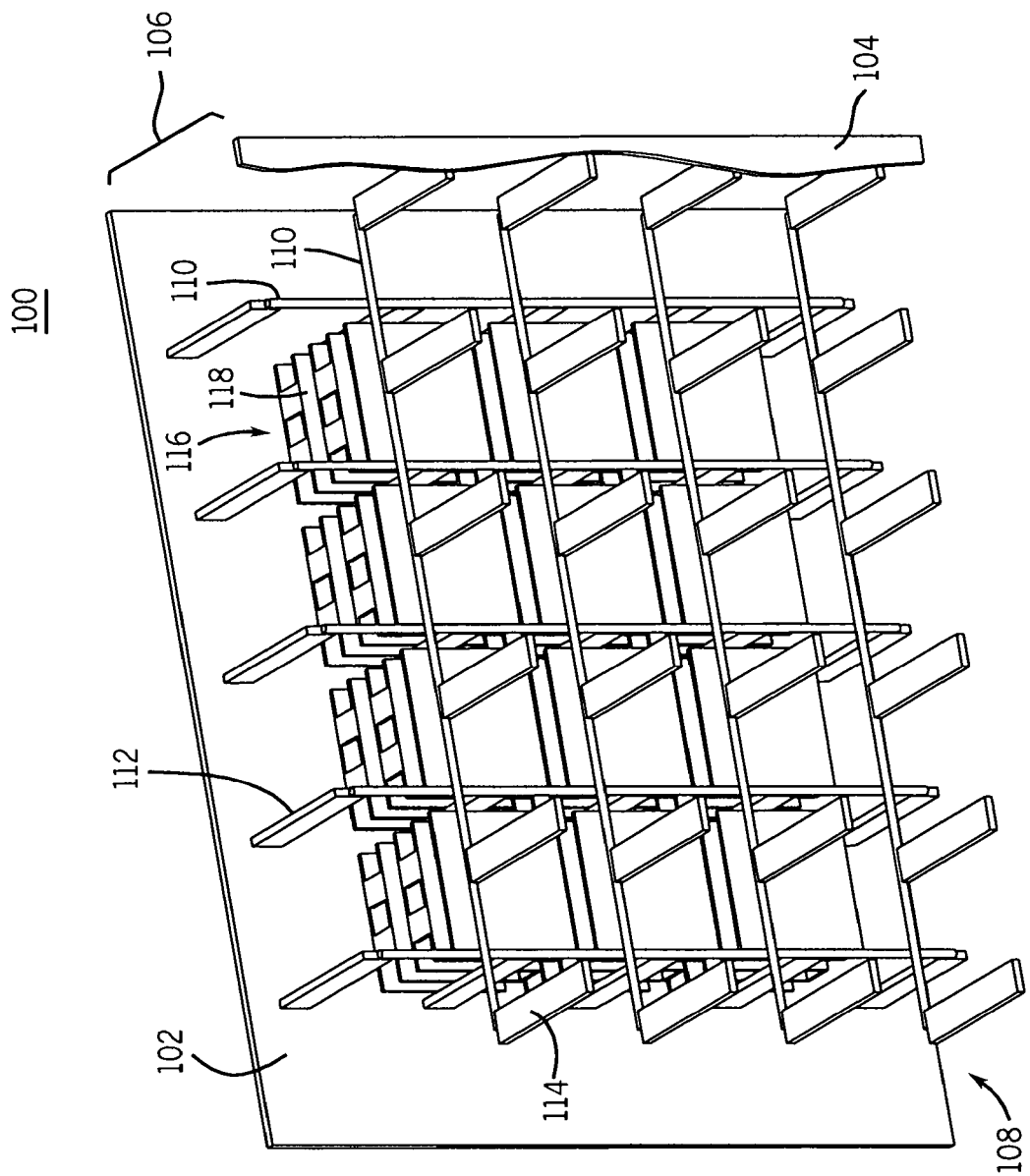
FIG. 1 is a perspective, partial, cutaway representation of an implementation of a vacuum insulation panel (VIP) that comprises a plurality of walls, one or more edges around the walls, a vacuum cavity surrounded by the walls and the edge, two or more supports, a plurality of elements such as tensile elements, and one or more electromagnetic radiation absorbers.

Referring to the BACKGROUND section above, an exemplary problem with current VIPs is that they have two serious heat loss mechanisms: a) conduction around the panel through their relatively impermeable membrane (edge losses), and b) conduction through the panel's contents (area losses). An exemplary approach significantly reduces these heat loss mechanisms as well as black body radiation through a VIP. The first two losses are described in the following exemplary equations. The flow of heat around the edge of the VIP (between the front and rear VIP surfaces) is:

$$Q_{edge} = \kappa_{edge} * \frac{t\_edge * P_{panel}}{A_{panel}} * \frac{\Delta T}{H\_edge} \quad (1)$$

where $\kappa_{edge}$ and t_edge are the thermal conductivity and thickness of the relatively impermeable membrane, $P_{panel}$ and $A_{panel}$ are the length of the perimeter and cross-sectional area, respectively, H_edge is the thickness, and $\Delta T/H\_edge$ is the thermal gradient across the VIP.

Exemplary vacuum insulation panels (VIPs) comprise a substantially impermeable membrane made from 6 μm (micrometer) thick relatively and/or highly thermally conductive Aluminum ($\kappa_{Al}$~150 W/m*° K) laminated to a polyester film ($\kappa_{polyester}$~0.2 W/m*° K). Since in an example the polyester thickness is comparable to the Aluminum but its thermal conductivity is so much lower, an exemplary approximation for $\kappa_{edge}$ and t_edge is $\kappa_{Al}$ and $t_{Al}$, the thermal conductivity and thickness of the Aluminum. The flow of heat through the cross-sectional area of the VIP is:

$$Q_{area} = \kappa_{area} * A_{panel} * \frac{\Delta T}{H\_edge} \quad (2)$$

where $\kappa_{area}$ is the thermal conductivity of the core of the panel (e.g., ~0.004 W/m*° K). This heat may be compared to an exemplary trapped air thermal insulator like Styrofoam, where $$Q_{styro} = \kappa_{styro} * A_{panel} * \frac{\Delta T}{H\_edge} \quad (3)$$

where $\kappa_{styro}$ is the thermal conductivity of Styrofoam (typically ~0.025 W/m*° K). Without any edge losses the improvement exemplary VIPs have over conventional thermal insulators is a factor of:

$$\frac{Q_{styro}}{Q_{area}} = \frac{\kappa_{styro}}{\kappa_{area}} \cong 6. \quad (4)$$

The R value for insulation is proportional to its thickness and inversely proportional to its thermal conductivity. Styrofoam has an R value of 5/inch and a conventional VIP would have an R value of 30/inch when edge losses can be ignored. Edge loss represents a significant thermal short around this insulation gain and a 1 foot×1 foot VIP with a 6 μm thick Al film membrane would have an R value of only 1.6 times that of a Styrofoam panel of the same thickness. Vacuum insulation panels can be improved significantly by decreasing the heat loss through the area of the panel by a factor of up to ~20000 instead of a factor of ~6. Exemplary ultra-low thermal conductivity insulation is provided.

Figure 2:
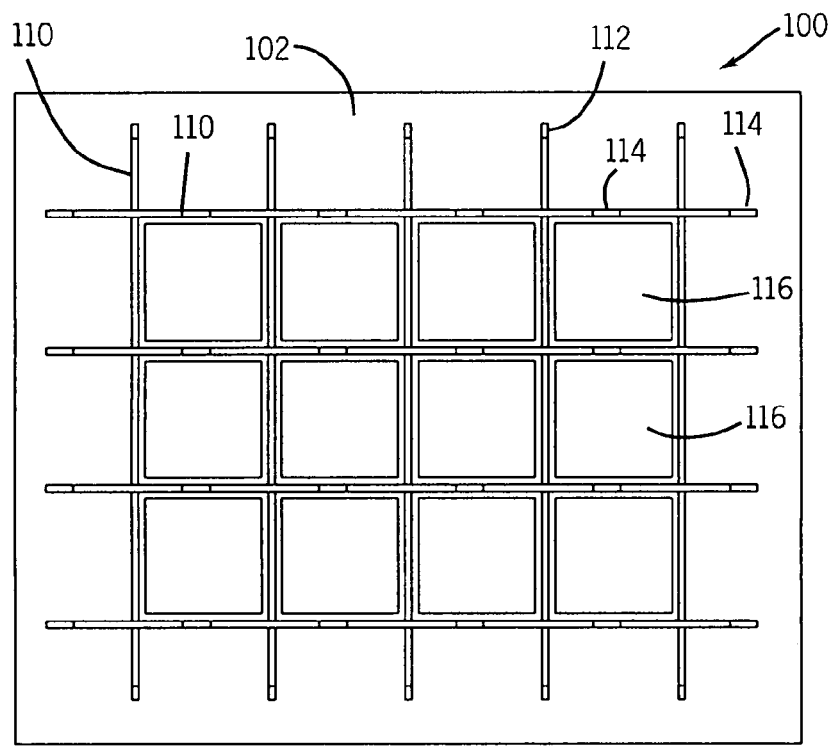
FIG. 2 is a top, partial, cutaway representation of an implementation of the VIP of FIG. 1.
Figure 3:
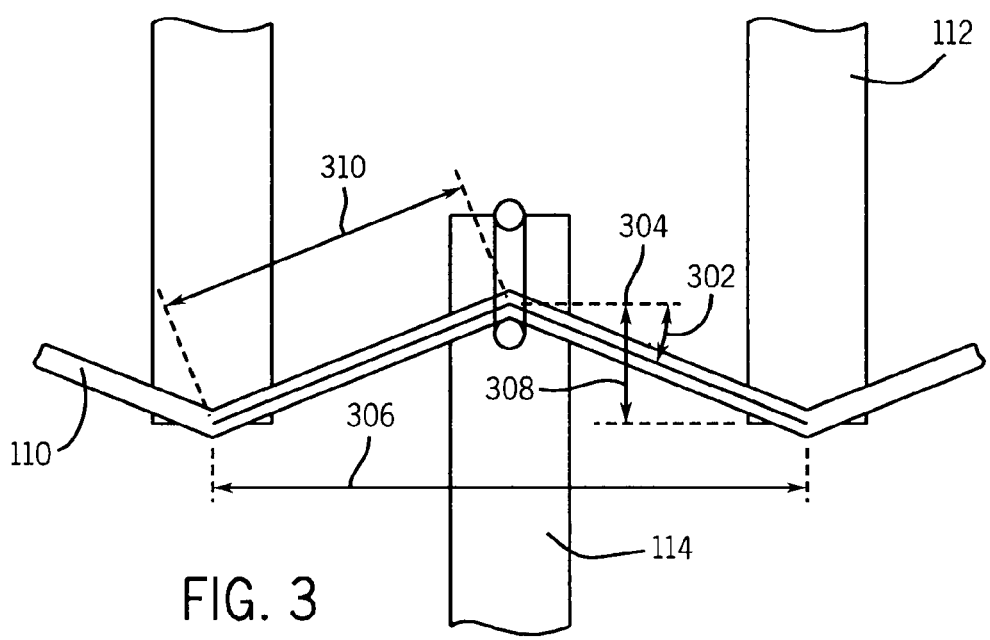
FIG. 3 is a side, partial, enlarged, sectional, cutaway representation of two of a first set of supports, one of a second set of supports, and a tensile element of an implementation of the VIP of FIG. 1.

Turning to FIGS. 1-3, an implementation of an apparatus such as a vacuum insulation panel (VIP) 100 in an example comprises a plurality of walls such as walls 102 and 104, one or more edges such as edge 106 between the walls 102 and 104, a vacuum cavity 108 surrounded by the walls 102, 104 and the edge 106, a plurality of elements such as tensile elements 110, and one or more supports such as support 112, 114 and/or connecting bar 402, 404. A further exemplary implementation comprises one or more electromagnetic radiation absorbers and/or black body emissivity shields 116. For example, the black body emissivity shields 116 comprise foils 118. The electromagnetic radiation absorbers and/or black body emissivity shields 116 in an example approximately and/or substantially serve to as black body shields. Exemplary black body emissivity of the electromagnetic radiation absorbers and/or black body emissivity shields 116 comprises less than 0.05, less than 0.15, and/or less than 0.4. The walls 102 and 104 are structurally coupled to allow formation of the vacuum cavity 108 between the walls 102 and 104. A plurality of tensile elements 110 in an example structurally supports the walls 102 and 104 against external pressure contemporaneous with tension on the plurality of tensile elements 110. The plurality of tensile elements 110 is located in the vacuum cavity 108. In another example, a plurality of compressive elements (not shown) structurally supports the walls 102 and 104 against external pressure contemporaneous with compression on the plurality of compressive elements.

Exemplary tensile elements 110 comprise one or more of filaments, fibers, wires, glass, ceramic, metal alloy, aramid, and/or polymer. The tensile elements 110 in an example comprise a meshed arrangement at an intermediate location between the walls 102 and 104. The supports 112 in an example extend from the wall 102 and into the vacuum cavity 108 to engage the meshed arrangement of tensile elements 110. The supports 112 in an example comprise a set of pillars that extend from the wall 102 and into the vacuum cavity 108 to engage the meshed arrangement of tensile elements 110. For example, the meshed arrangement of tensile elements 110 comprises a plurality of sets of obliquely and/or orthogonally overlaid and/or criss-cross wires. The supports 114 extend from the wall 104 and into the vacuum cavity 108 to engage the meshed arrangement of tensile elements 110. The supports 114 in an example comprise a set of pillars that extend from the wall 104 and into the vacuum cavity 108 to engage the meshed arrangement of tensile elements 110. For example, the supports 112 extend from the wall 102 in a general direction distinct with respect to another general direction in which the supports 114 extend from the wall 104. An exemplary analogy of the implementation of the tensile elements 110 and supports 112, 114 of FIGS. 1-3 may be viewed as resembling telephone wires strung across the supports 112 and 114 across faces of the walls 102 and 104, respectively. As described herein with reference to FIGS. 4-6, an exemplary analogy of another implementation of the tensile elements 110 and supports 112, 114 of FIGS. 4-6 may be viewed as the tensile elements 110 spanning a pair of structural fingers as the supports 112 and 114 where each pair of structural fingers replaces a telephone pole in the analogy described with reference to FIGS. 1-3. One or more pluralities of tensile elements 110 and the supports 112 and 114 in an example are located in the vacuum cavity 108 between the walls 102 and 104. The one or more pluralities of tensile elements 110 in an example serve to structurally support the walls 102 and 104 against external pressure contemporaneous with tension on the one or more pluralities of tensile elements 110.

The VIP 100 in an example comprises upper and lower support plates as the walls 102, 104 separated by an array of vertical supports as the supports 112, 114. Between the supports are thermally insulating filaments as the tensile elements 110. Between the vertical supports are implementations toward black body shields as the electromagnetic radiation absorbers and/or black body emissivity shields 116. The filaments may terminate at the base of the upper or lower support plates, for example, the walls 102 or 104 of FIG. 1, or on a stronger vertical support such as the support 112 or 114 of FIGS. 4-6.

Referring to FIGS. 1-3, the tensile strength of the tensile elements 110 in an example serves to support the atmospheric load:

$$2\sigma_{max} \frac{\pi * d^2}{4} \sin(\vartheta) = P_o * \lambda^2 \qquad (5)$$

where $\sigma_{max}$ is the maximum allowed tension in the tensile element 110, d is the diameter of the tensile element 110, θ 302 is the angle the tensile element 110 makes with a plane 304 substantially parallel with the walls 102, 104, λ 306 is the periodicity of the structure in X and Y axial directions taken with reference to the plane 304 substantially parallel to the wall 102 or 104, and $P_o$ is the atmospheric load of approximately 0.1 MPa supported by the tensile elements 110. The period λ 306 in an example may be the same or different in the X and Y axial directions. The filaments as the tensile elements 110 in an example comprise a maximum vertical extent h 308. The length L of the heat path between upper and lower supports is twice the distance 310. In other words, the distance 310 is half the length L of the heat path. The distance 310 on filaments as the tensile elements 110 tethered to an upper support as the support 114 and the distance 310 is added again on filaments as the tensile elements 110 tethered to a lower support as the support 112. The filaments on the lower supports in an example are rotated ninety degrees with respect to the filaments on the upper supports.

Exemplary equation 5 can be rearranged to give the filament diameter:

$$d = \sqrt{\frac{2}{\pi * \sin(\vartheta)} * \frac{P_o}{\sigma_{max}}} * \lambda. \qquad (6)$$

If the filaments are horizontal before loading, the amount they stretch determines the angle they make with the horizontal as defined in exemplary equations 7 & 8:

$$\cos(\vartheta) = \frac{\lambda}{L} \qquad (7)$$

$$\sin(\vartheta) = \frac{h}{L} \qquad (8)$$

where "L" is the stretched length of the filaments between supports, it is also half the length of the thermal conduction path between an upper and lower support. The heat flow through the tensile structure in an area of $\lambda^2$ shown in FIG. 1 is given by the following exemplary equation (neglecting all thermal impedances except for the heat flow through the filaments):

$$Q_{filament} = 2 * \kappa_{filament} * \frac{\pi * d^2}{4} * \frac{\Delta T}{L} = \kappa_{filament} * \frac{\pi * d^2}{2} * \frac{\Delta T * \sin(\vartheta)}{h} \qquad (9)$$

where "$\kappa_{filament}$" is the thermal conductivity of the filament. Neglecting edge losses the reduction in heat flow of the structure shown in FIG. 1 is given by the following exemplary equation 10 after using exemplary equation 6 to eliminate the diameter of the filament:

$$\frac{Q_{styro}}{Q_{tensile}} = \frac{\kappa_{styro}}{\kappa_{filament}} * \frac{\sigma_{max}}{P_o} * \frac{h}{H\_edge}. \tag{10}$$

Exemplary materials for the filament will have as large a ratio of tensile strength ($\sigma_{max}$) to their thermal conductivity ($\kappa_{filament}$) as possible without loss of strength in the temperature range to which either support plate of the VIP is exposed.

An exemplary choice for the filament at temperatures below 160° C. (320° F.) is Kevlar, for example, offered under the trade identifier DuPont Kevlar® 29 and 49 aramid fiber which has a maximum tensile stress of ~3 GPa and a thermal conductivity of 0.040 W/m*° K, which reduces the heat flow by 18750 assuming that the vertical extent of the filaments is approximately the full thickness of the VIP (h 308 approximates H_edge 602, FIG. 6) and neglecting the thermal impedance of the supports, and the contact resistance from the supports to the filaments and between the filaments.

To avoid filament breakage in an example the maximum stress in the Kevlar filaments would be reduced below 3 GPa, and further if the structure needs to support a load. Using a safety factor of 9.4 ($\sigma_{max}$=320 MPa) produces a reduction in heat flow through the VIP area by a factor of 2000 compared to a Styrofoam layer of the same thickness as the total vertical deflection of the filaments, (h). This may be compared with the factor of 6 mentioned for a conventional VIP with a perlite or silica microsphere filler. This represents an R value of $10^4$/inch when edge, black body, and convection losses can be ignored.

The maximum elongation of Kevlar 49 filaments in an example is ~2.5% before breakage and using a safety factor of 9.4 implies a stretch of 0.27% or θ=4.2°, if the filaments are horizontal and under minimal tension before the structure supports an atmospheric load. Using these values in exemplary equation 6 indicates that the filament diameter is 5.2% of the support period, λ. If the supports are transparent and a fine Kevlar thread diameter is used in an example the structure can relatively and/or greatly decrease the heat flow through a window with minimal loss of optical transparency. An exemplary loss of optical transparency with clear supports but an opaque filament is given by exemplary equation 11. For example, this allows the structure to be used to create a better structure to block heat than conventional thermopanes.

$$\text{Optical loss} = \frac{2*d}{\lambda} \tag{11}$$

Figure 4:
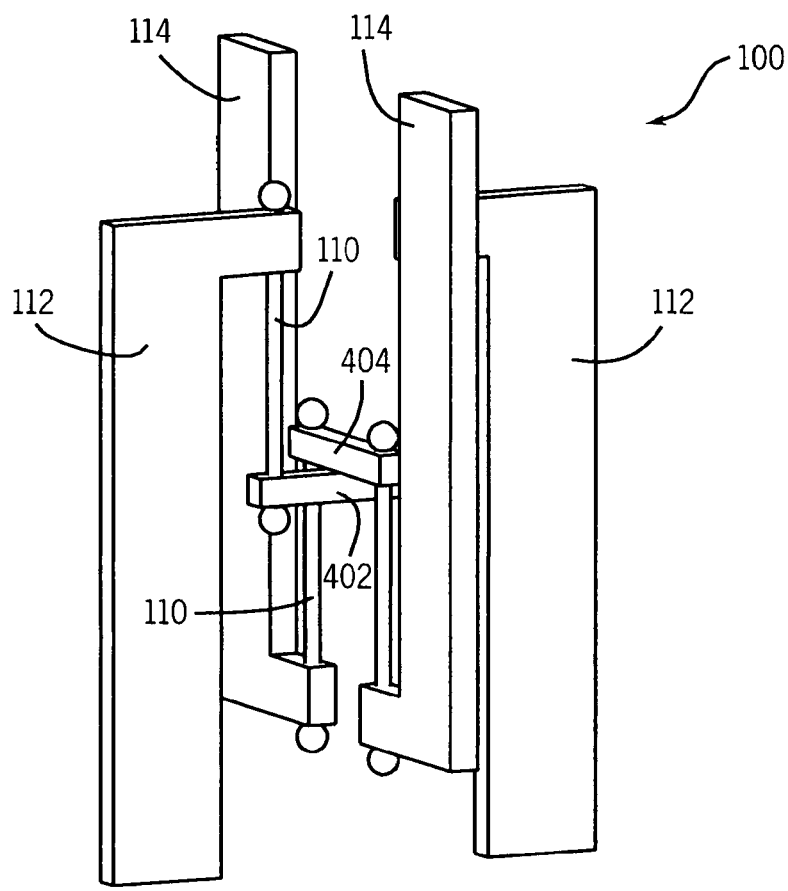
FIG. 4 is a perspective, partial representation of another exemplary implementation of the supports and tensile elements of an implementation of the VIP of FIG. 1.
Figure 5:
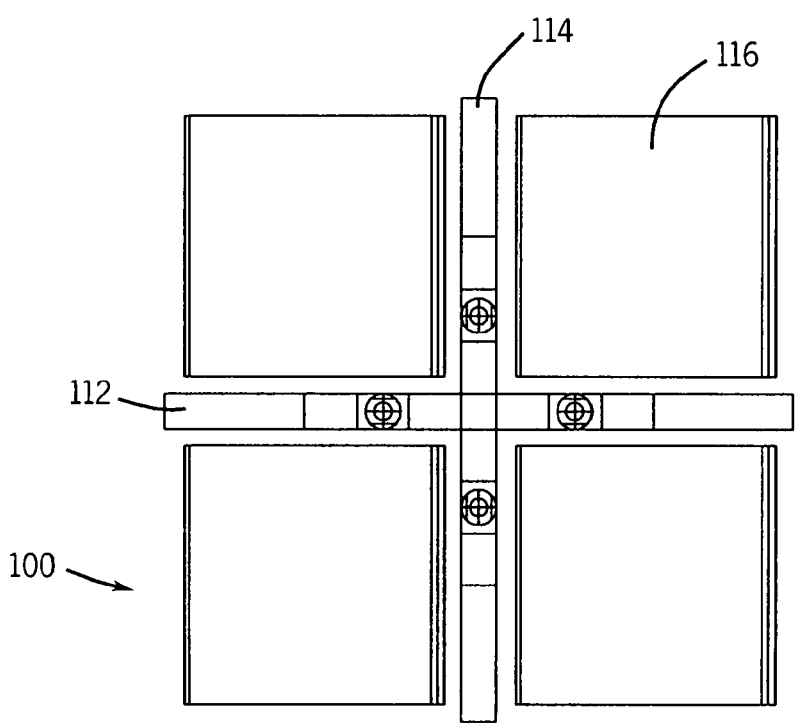
FIG. 5 is a top representation of the supports and tensile elements of the implementation of the VIP of FIG. 4, and further illustrates an exemplary implementation of the electromagnetic radiation absorbers of FIG. 1.
Figure 6:
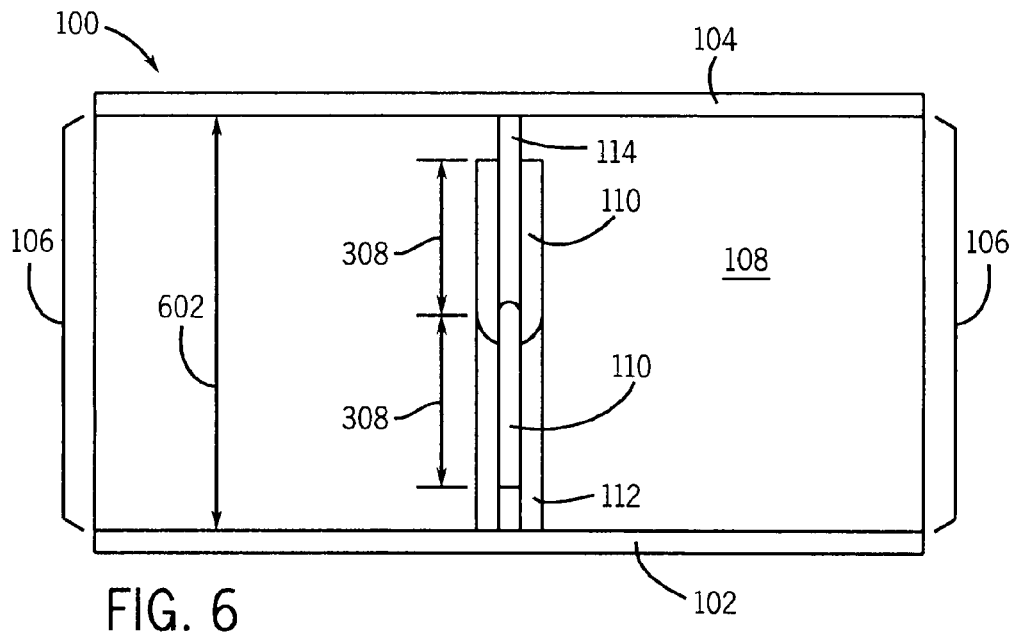
FIG. 6 is a side representation of another implementation of the supports and tensile elements of the VIP of FIG. 4, and further illustrates an exemplary implementation of the walls, and vacuum cavity of FIG. 1.

The optical losses can be reduced further by using transparent filaments or a larger value of θ. The latter can be achieved by letting the filaments have some slack before loading, or a smaller safety factor. One implementation that minimizes optical losses would be an array of pairs of closely spaced vertical supports so that θ can be ~90° as shown in FIGS. 4-6. Assuming the vertical supports are optically transparent and the tensile filaments are optically opaque and hanging vertically as shown in FIGS. 4-6, then the optical loss is given by exemplary equation 12. This leads to ~0.03% optical loss with 320 MPa maximum stress in the filaments.

$$\text{Optical loss} \cong \frac{3*P_o}{\sigma_{max}}. \tag{12}$$

Turning to FIGS. 4-6, the VIP 100 in an example comprises a plurality of interlocking pairs of vertical supports as the supports 112 and 114. An exemplary heat flow path proceeds up the lower pair of vertical supports as the supports 112, down the thermally insulating filaments as a first set of the tensile elements 110, across a connecting bar 402 tethered to the lower set of filaments as the first set of tensile elements 110, to a connecting bar 404 tethered to the thermally insulating filaments as a second set of the tensile elements 110 attached to the upper vertical supports as the supports 114, down the thermally insulating filaments as the second set of the tensile elements 110, and up the pair of upper vertical supports as the supports 114. Referring to FIG. 5, the electromagnetic radiation absorbers and/or black body emissivity shields 116 in an example occupy space between and/or among interlocking pairs of supports as the supports 112 and 114. Referring to FIG. 6, the insulating filaments as the tensile elements 110 in an example are tethered to the upper and lower vertical supports as the supports 112, 114 and the insulating filaments directly touch as between different sets of the tensile elements 110, for example, eliminating a need for the connecting bars 402, 404 of FIG. 4.

As indicated in exemplary equation 10 the maximum reduction in heat flow the array of tensile filaments as the tensile elements 110 has over a Styrofoam panel as the VIP 100 is achieved when the vertical deflection of the filaments h 308 is as close as possible to the total thickness H_edge 602 of the edge 106 of the VIP 100. A quick analysis of the maximum deflection is to assume the supports 112, 114 and the tensile element 110 are comparable to a circular plate of radius r=λ/2 and use the following exemplary formula for circular plate deflection.

$$\delta_{max} = \delta_{center} = \frac{3*P_o*r^4*(1-v^2)}{16*ESS*tplate^3} \tag{13}$$

In the exemplary formula 13, the thickness of the plate is 2 mils (tplate), it is made of stainless steel with a Young's modulus of 200 GPa (ESS), Poisson's ratio is 0.29 (v), radius (r) is 2.5 mm (λ~5 mm) and the maximum deflection predicted by exemplary equation 13 is ~26 μm.

The maximum deflection on the lower support plate in an example occurs at the point furthest from the lower vertical supports, and is directly below the vertical support on the upper support plate when the tensile filaments are supported as indicated in FIG. 1. For example, when the thermal edge losses are negligible then the upper and lower support plates are selected to be thick enough to prevent any direct contact between the support plates and the opposing vertical supports in order for substantially all and/or all of the heat to flow either through the filaments or the edge of the panel. An exemplary approach employs thicker material for the support plates and/or decreases the periodicity of the vertical supports (λ) Exemplary support plates are substantially impermeable and/or impermeable to substantially all and/or all gasses that could raise the pressure inside the VIP above ~$10^{-2}$-$10^{-5}$ torr.

An exemplary approach minimizes the thermal conduction along the support plates, for example, when thermal edge losses are significant and/or a double layer of VIPs are desired and/or necessary. Two exemplary, relatively inexpensive choices for the support plates are 51 μm thick stainless steel, and 127 μm thick hard temper aluminum foil. These both can withstand atmospheric pressure with a suitable support period, and cost ~$0.20/ft². Stainless steel has an exemplary advantage of lower thermal conductivity and/or of being more chemically inert. Aluminum has an exemplary advantage of a lower permeability to Hydrogen. A combined layer of ~51 μm thick stainless steel and ~6 μm thick Aluminum foil represent an exemplary, relatively low cost material for the upper and lower support plates for a VIP with exemplary minimization of both the thermal conduction and the vacuum permeability, for example, in order to maximize VIP heat reduction and lifetime.

Additional exemplary choices of filaments may not have quite as large a ratio of tensile strength to thermal conductivity but in an example may have advantages over Kevlar. At high temperatures carbon, glass, and ceramic filaments can have relatively and/or very high ratios of tensile strength to thermal conductivity. Exemplary metals as potential candidates comprise stainless steel (ultimate tensile load ~1.03 GPa, $\kappa_{SS}$~12 W/m*° K; e.g., Gall-Tough PLUS™ Stainless, Annealed, 25% cold work) and Timetal (ultimate tensile load ~1.03 GPa, $\kappa_{Timetal}$~4.15 W/m*° K; e.g., Temetal 685 (Ti-6Al-5Zr-0.5Mo-0.25Si) Titanium alloy). Asbestos is another exemplary high temperature candidate. In an example, at temperatures below 160° C. exemplary polymers can be considered in addition to the materials mentioned previously, as well as polymer coated Kevlar. At high temperatures an effective increase in the ratio of tensile strength to thermal conductivity can be achieved by a more involved tensile support. Three or more tensile supports at one spot on the VIP would support a triangle or other shaped base, this base would support another base, etc., forcing the heat to have a longer path from one VIP surface to the other VIP surface.

An array of compressive elements (not shown) may serve to support atmospheric pressure in the VIP using primarily glass and ceramic spacers. The reduction in heat flow for a compressive structure that just supports atmospheric pressure in an example is:

$$\frac{Q_{styro}}{Q_{compressive}} = \frac{\kappa_{styro}}{\kappa_{compressive}} * \frac{Compressive_{max}}{P_o} \quad (14)$$

where "$\kappa_{compressive}$" and "$Compressive_{max}$" are the thermal conductivity and maximum compressive load of the compressive elements, respectively. Ultem has an ultimate compressive load ~152 MPa, $\kappa_{plastic}$~0.122 W/m*° K (e.g. trade identifier GE Plastics Ultem 1000 PEI, Polyetherimide, unfilled, extruded), Zirconia has an ultimate compressive load of ~2100 MPa, $\kappa_{zirconia}$~2 W/m*° K (e.g., trade identifier Sapco Partially stabilized TZP Zirconia, YSZ), and Titanium Beta III has an ultimate compressive load of ~1320 MPa, $\kappa_{TibetaIII}$~6.3 W/m*° K (e.g., trade identifier Titanium Beta III, ST 775° C., Aged 495° C.). These comprise exemplary choices for compressive materials. Their ratio of maximum tensile strength to thermal conductivity is significantly less than that offered by Kevlar.

An array of compressive spacers (not shown) in an example has a tendency to buckle or wrinkle well before the maximum compressive load is reached. Tensile elements do not have this failure mode, they can break when their maximum stress is exceeded but they can not buckle or wrinkle. Compressive spacers can be corrugated to help reach their maximum load.

Three polypropylene yogurt cups in an example supported ~220 pounds for ~1 minute before wrinkling. Polypropylene average ultimate compressive load ~40 MPa, $\kappa_{polypropylene}$~0.1 W/m*° K (e.g., Polypropylene, Impact Modified: Molded/Extruded). Aligning the polymer molecules by processing increases the maximum compressive load of plastic. The polypropylene containers wrinkled after supported an estimated load in of ~4.2 MPa.

Figure 7:
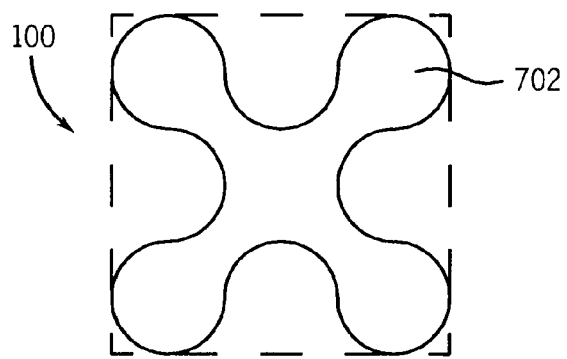
FIGS. 7-8 are exemplary cross-sectional representations of a corrugated support of an implementation of the VIP of FIG. 1.
Figure 8:
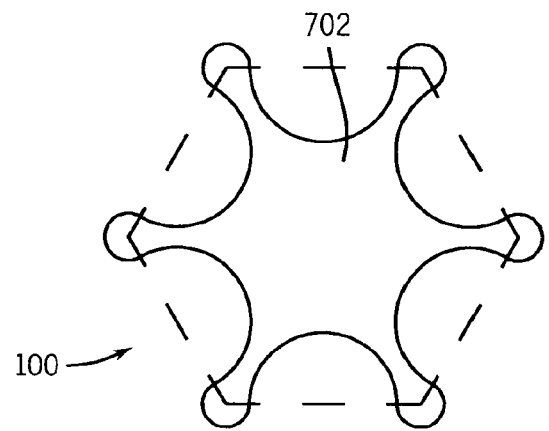

Turning to FIGS. 7-8, a cross-sectionally corrugated support 702, for example, supports 112, 114 or compressive spacers, may serve to increase load they can carry before buckling or wrinkling.

In order for VIPs to function as a thermos the pressure within the VIP must be less than ~$10^{-2}$-$10^{-5}$ torr. Conventional VIPs use a 6 μm thick layer of Aluminum as a vacuum barrier which has a very high thermal conductivity ($\kappa_{Al}$~150 W/m*° K). The gasses in the atmosphere that are above 0.0001 torr are Nitrogen (593 torr), Oxygen (159 torr), Argon (7.1 torr), $CO_2$ (0.25 torr), Neon (0.014 torr), Helium (0.004 torr), Methane (0.0013 torr), Krypton (0.0009 torr), and Hydrogen (0.0004 torr) and water vapor (0 to 24 torr at 25° C. depending on relative humidity).

Figure 9:
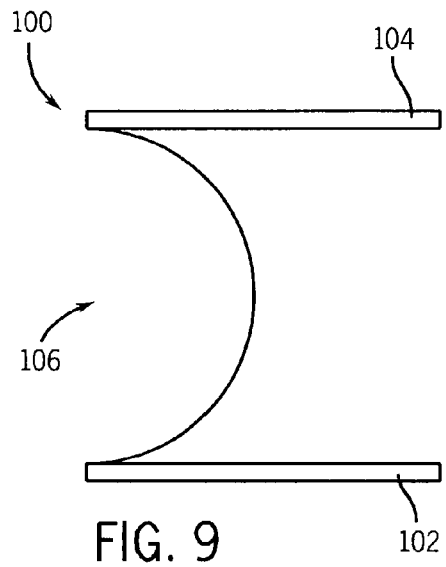
FIGS. 9-12 present exemplary edges of an implementation of the VIP of FIG. 1.

As mentioned previously, edge losses along the vacuum barrier can represent a significant thermal short for the VIP. As indicated schematically in FIG. 9, a vacuum can be maintained with a thin impermeable layer in an example provided that the maximum stress in the layer is not exceeded. The maximum stress in the edge of the VIP indicated in FIG. 9 is approximately given by exemplary equation 15.

$$\sigma edge_{max}*2*t\_edge=P_o*H\_edge \quad (15)$$

The overall gain through a VIP compared to Styrofoam and neglecting thermal conduction through the filaments is given by exemplary equation 16 where "H_effective" is the effective length that heat must flow across the VIP.

$$\frac{Q_{styro}}{Q_{edge}} = \frac{\kappa_{styro}}{\kappa_{edge}} * \frac{\sigma edge_{max}}{P_o} * \frac{2*A_{panel}*H\_effective}{P_{panel}*H\_edge^2} \quad (16)$$

To reduce the edge loss for the VIP, an exemplary approach employs a material with a relatively high and/or as high as possible of a ratio of maximum tensile strength to thermal conductivity ($\sigma edge_{max}/\kappa_{edge}$) that is also substantially impermeable and/or impermeable to a number of and/or most atmospheric gasses. Exemplary metals with high strength and low thermal conductivity are Timetal ($\kappa_{Timetal}$~4.15 W/m*° K)⁵, Ni alloy 180 ($\kappa_{SS}$~3.5 W/m*° K; e.g., Nickel Alloy 180 Copper Nickel Resistance), and stainless steel ($\kappa_{SS}$~10-30 W/m*° K; e.g., stainless steel data). Amorphous metals can have higher ratios of tensile strength to thermal conductivity.

Figure 10:
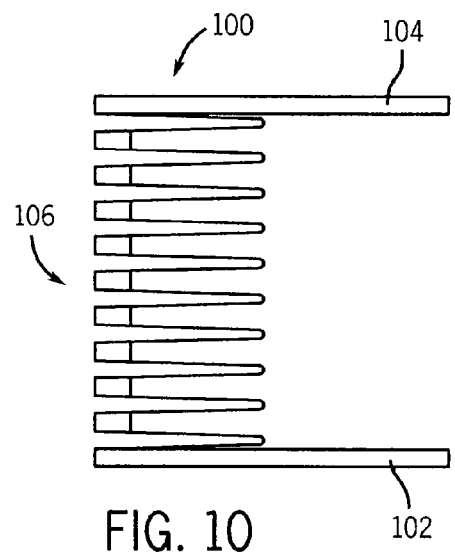

FIGS. 9-12 present exemplary edges 106 of the VIP 100. Exemplary reductions in the edge loss for the VIP can also be obtained by increasing the ratio of $\{(A_{panel}*H\_effective)/P_{panel}*H\_edge^2)\}$. As indicated in FIGS. 9-10, an exemplary approach for a given panel size employs a semicircle or corrugated edge geometry. Edge losses can also be reduced by using as large a panel as possible and using a panel shape with N-fold symmetry (panel looks the same when rotated 360°/N where N is the number of sides of the panel). Any panel with N-fold symmetry will have a ratio of $A_{panel}/P_{panel}=D_{panel}/4$, where $A_{panel}$ and $P_{panel}$, are the area, and the perimeter of the panel, and $D_{panel}$ is the diameter of the largest circle that fits entirely inside the panel. A square for example has four fold symmetry and the diameter of the circle is equal to the length of a side of the square. Using a 1 foot panel ($D_{panel}$=1 foot) with H_edge of 0.5 inch, a Timetal edge in the geometry of FIG. 9 gives a reduction in heat loss of ~1200 compared to a 1 foot Styrofoam panel. An exemplary approach reduces this ratio to provide a margin of safety to make sure the edge does not rupture. If the heat reduction compared to Styrofoam is reduced to 100 then a VIP panel would have an R value of 500/inch and a 0.5 inch panel would have an R value of 250 (equivalent to 50 inches of Styrofoam).

An exemplary approach maintains the vacuum below $10^{-2}$-$10^{-5}$ torr for the VIP to have little and/or no convection heat transfer. As indicated in FIGS. 9-12, in order to minimize heat transfer on the edge the VIP the vacuum barrier in an example is made as thin as possible, which makes it easier for gasses, especially hydrogen, to permeate the VIP wall. Hydrogen's pressure in the atmosphere is only 0.0004 torr[11] but it can be generated by the dissociation of water on the exterior surface of the VIP. This can be minimized in an example by depositing an oxide or ceramic layer over the metal barrier or encapsulating the VIP in a plastic film.

Figure 11:
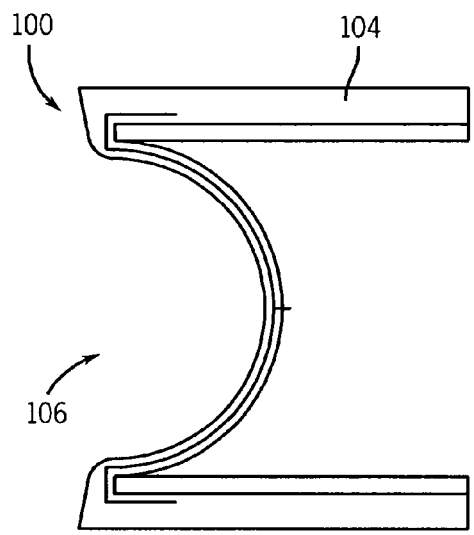
Figure 12:
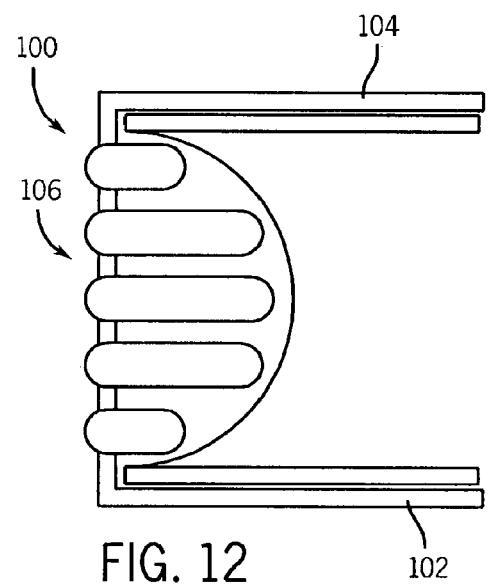

Another exemplary approach to preventing the diffusion of all gasses into the VIP is to deposit a thin continuous layer (0.03-0.10 μm) of Gold over the VIP's edge. Theses exemplary approaches are illustrated in FIGS. 11-12. If the price of Gold is $500/troy ounce, and a 0.03 μm thick layer is deposited around a 1 foot square VIP with a 0.5 inch edge as shown in FIG. 11, the cost of the Gold is ~$0.25. If the only edge heat transfer is through a 0.03 μm Au film ($\kappa_{Au}$~320 W/m*°K) the reduction in heat flow for a 1 foot panel that is 0.5 inch thick is ~310.

In FIG. 9, a thin layer of thickness "t_edge," can support atmospheric pressure while conducting minimal heat across the vacuum insulation panel (VIP). The relatively thick upper and lower surfaces of the panel ("2 mil thick stainless") hold the upper and lower supports respectively in FIG. 1. The thickness of the VIP is "H_edge," and the length of the path heat flows across a VIP is "H_effective." The indicated ratio of H_effective to H_edge is π/2.

In FIG. 10, the edge of the VIP can be stiffened with "supporting rings." The rings can be held in position w.r.t. (with respect to) upper and lower support plates with 3-4 thermal insulating filaments. The ratio of H_effective to H_edge is ~20.

In FIG. 11, a thin polymer layer can support atmospheric pressure while conducting minimal heat across the VIP. Polymers are relatively permeable, and a thin but continuous Au layer can provide the impermeable barrier required by the VIP.

In FIG. 12, a secondary polymer layer can minimize water vapor from contacting the thin edge of the VIP, and provide a border that can withstand roughed handling than a very thin metal edge. The secondary border can also function as a weather seal and prevent convection currents between VIP edges.

Figure 13:
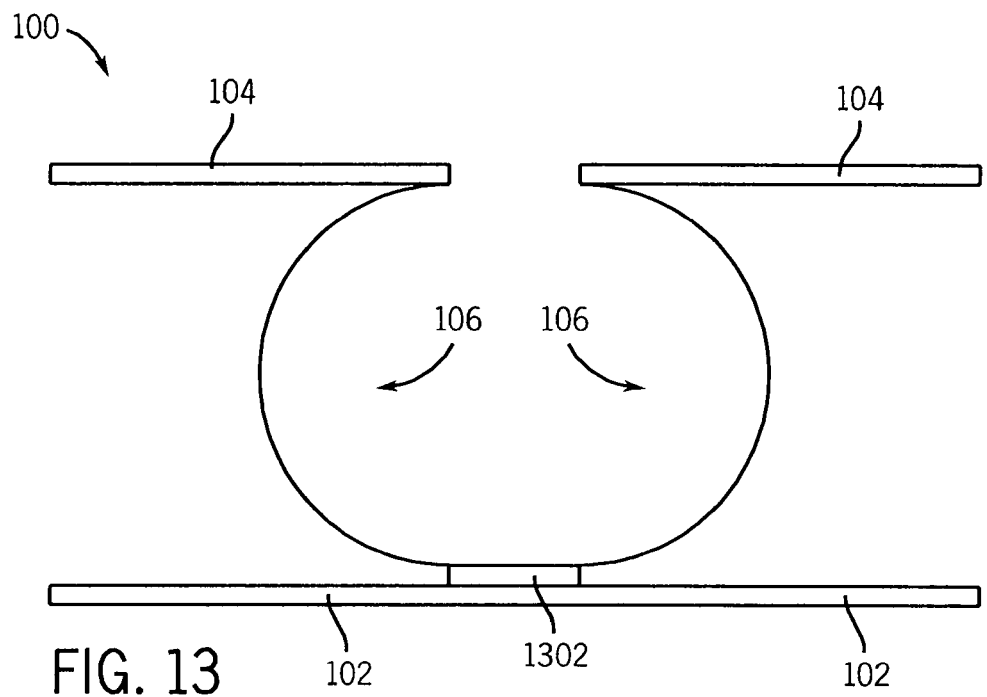
FIG. 13 presents a seal of an implementation of the VIP of FIG. 1.
Figure 14:
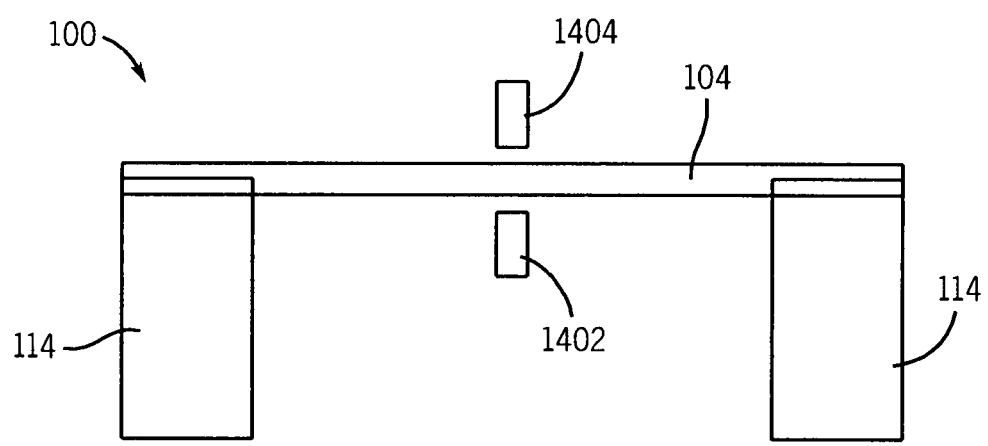
FIG. 14 presents a magnetic bead of an implementation of the VIP of FIG. 1.

Turning to FIGS. 13-14, a seal 1302 can be fabricated by localized super plastic deformation, or by distributed physical vapor deposition (DPVD). A robust seal in an example welds two thick extended sections of the upper or lower support plate.

The upper and lower vertical supports can be attached to the upper and lower support plates by exemplary approaches including the following. Exemplary approach 1) A metal forming operation can deform the base plates to create an array of vertical supports. Exemplary approach 2) A strip of metal can be folded and welded to the base plates to create the vertical supports. Selective cuts, folds, and welds in this metal strip can be used to stiffen the vertical supports. Exemplary approach 3) Individual vertical supports can be attached to the base plates with adhesive or welding. Exemplary approach 4) A thick base support can have material removed to leave the vertical supports.

Exemplary approach 1 above in an example is relatively inexpensive to implement. An array of vertical supports can be easily created with ellipsoidal cross-sections instead of the rectangular cross-section indicted in FIG. 1. Sharp corners tend to concentrate stresses in load bearing structures. An ellipsoidal cross section in an example serves to stiffen the vertical supports in the direction of the tensile filament. The force from the tensile filaments in an example is balanced on all vertical supports except at the edges of the VIP array, or if a filament breaks in a neighboring cell. A stronger vertical support can be used at the ends of the array or the filament can be anchored to the edge of the base plate. Vertical supports can be formed with the more elaborate cross-sections indicated in FIGS. 7-8.

Exemplary approaches 2 and 3 above of attaching vertical supports provide exemplary strengthening of the base plates in relatively high stress locations, for example, where the base plate is joined to the vertical supports. Exemplary approach 3 provides stiffening of the base plate while reducing and/or minimizing the heat flow along the base plate.

The filament can attached to the vertical supports by a number of approaches including the following. Exemplary approach 1) A trough can be created in the vertical support and the filament laid into the trough and attached to the vertical support with adhesive (or welding when the filament can be welded to the vertical support). The trough can match the angle the filament will make with the horizontal when it is supporting the atmospheric pressure. Exemplary approach 2) The filaments can be tied to the vertical support, including going through holes in the vertical support, or wrapping around the vertical support.

Exemplary approach 1 above is relatively inexpensive to implement. Many filaments like Kevlar lose mechanical strength when they are tied or bent because of the stress concentration gradients. Use of adhesives and welding of filaments can improve the ability of the VIP to withstand isolated filament breaks.

To minimize heat loss the filaments in an example can be operated relatively close and/or as close as possible to their breaking strength. Exemplary reliability of the structure may be enhanced by designing the VIP to withstand isolated breaks in the filaments with substantially little and/or minimal increase in heat flow through the VIP. This may be achieved in an example by stringing a thicker secondary filament below the first filament that is held out of thermal contact unless the filament breaks. This can also be achieved in an example by using thicker base plates.

To reduce heat flow through the VIP to a minimum in an example black body radiation between the upper and lower support plates is desired and/or must be blocked. This can be achieved in an example by stacking relatively thin low emissivity shields between the upper and lower support plates, for example, in the spaces between the tensile filaments and vertical supports.

Exemplary approaches for minimizing black body radiation include the following. Exemplary approach 1) Layers of a very thin low emissivity foil (6 μm Aluminum, ~1 μm metallized mylar, etc.) can be stacked and anchored with adhesive or a forming operation. Alternating the location of the anchor points from layer to layer in an example serves to reduce and/or minimize thermal conduction between layers. Exemplary approach 2) The foil can be folded in a serpentine manner to create the black body shield. Removing material from the foil at the fold lines in an example serves to minimize thermal conduction along the black body shield. Thermal conduction between upper and lower supports plates through the black body shield in an example is substantially reduced and/or eliminated by attaching half of the black body shield to the upper plate, half to the lower plate, and insuring that the two sections of the black body shield are not in physical contact.

An estimate of the black body radiation between the upper and lower support plates is provided in exemplary equation 17, where Qbb is the heat flow due to black body radiation, σbb is the Stefan-Boltzman constant, ε is the emissivity of the upper and lower support plates and the black body shields, Tupper and Tlower are the temperatures of the upper and lower base plates, respectively, and Nshield is the number of black body shields placed in between the upper and lower support plates. The number of shields needed in an example depends on the upper and lower support plate temperatures and the desired reduction in black body heat flux. Assuming the outside temperature ranges from +130° F. to −50° F. and the inside temperature is 72° F. then the number of shields needed to reduce the heat flow to ~0.3% of what flows through a 0.5 inch thick layer of Styrofoam in an example is ~30 assuming an emissivity of 0.03. This heat flow can be further reduced in an example by stacking more black body shields, but in an example black body radiation will still transfer heat to the upper and lower tensile elements and between the upper and lower filament vertical supports. Black body shields in an example can be arranged to block this exemplary approach of heat transfer as well, for example, when it is economically justified. Relatively large numbers of parallel black body shields in an example may be stacked with higher precision to avoid unintended contact and therefore increased thermal conduction between shields.

$$Qbb = \sigma bb * \varepsilon * A_{panel} * \frac{(Tupper^4 - Tlower^4)}{Nshield + 1} \quad (17)$$

The structure shown in FIG. 1 in an example may be stacked, for example to create an even more effective heat reduction and/or to incorporate additional black body shields. Exemplary calculations indicate that ~100 fold reduction in heat flow compared to Styrofoam can be achieved with a single 0.5 inch thick VIP. This assumes a contribution of ~1/300 from edge losses with a ~0.03 μm layer of Au, ~1/300 from black body radiation, and ~1/300 from miscellaneous other losses. These exemplary calculations assume negligible thermal conduction through the area of the panel based on published values for thermal conductivity and maximum tensile strength for materials under consideration for use as tensile filaments.

The thermal conductivity of these materials may be increased under tensile loads and consequently their contribution to heat flow may be increased through the area of the VIP. Using an R value of 2.5/inch for Styrofoam, a 100 fold reduction in heat flow translates into an R value of 250 for the 0.5 inch VIP. The current department of energy (DOE) recommendations for a new house in Minneapolis with an electric furnace is an R21 in walls (optimum value engineering wall cavity) and R49 in attics.

To extend the lifetime of an exemplar VIP, getters can be incorporated into the structure, for example, to maintain vacuum in the presence of small leaks, permeation, and out gassing. An exemplary VIP can have selected sections heated to relatively and/or very high temperatures to activate a getter prior to sealing. An example would be the portions of the upper and lower support plates between the vertical supports, for example, since this material is not in contact with the polymer tensile elements. Getter material can be incorporated into the design of the VIP in the foil used for the black body shields. An all metal design for the VIP including tensile filaments can be baked and activated prior to operation.

An exemplary VIP also functions as a firewall, for example, if polymers are not used to encapsulate the structure.

To address questions about the vacuum integrity of the VIP in an example it is beneficial to test to verify the vacuum level at any point after a VIP has been manufactured. An exemplary test is inexpensive and will not degrade the vacuum barrier integrity by requiring a valve or wires through the vacuum barrier. A magnetic bead 1402 in an example is placed on a thermally insulating tensile filament supported by two vertical supports on the upper or lower support plate as shown in FIG. 14. Attracting the bead to a rotating or oscillating external magnetic field such as by a magnet 1404 in an example causes the bead to heat up from friction as it slides back and forth on the insulating tensile element until approximately the Curie point is reached. The presence or absence of the bead's motion in an example can be detected by a vibration sensor, for example, provided the rest of the VIP is constructed with non-magnetic materials.

After the bead's motion stops or diminishes in an example a period of time is allowed to pass for the bead to cool off, and then the test is repeated. Evaluating the difference in time required for motion to cease or be diminished in an example measures the rate of heat loss from the bead. If the vacuum sensor is designed so that the dominant mode of heat loss is transfer to gas when the pressure in the VIP is above $10^{-2}$-$10^{-5}$ torr in an example then the sensor will take a relatively and/or very short time to heat to the curie point on the second measurement, for example, if the vacuum level is no longer adequate.

The insulating tensile element in an example is able to maintain structural integrity while a hot bead is sliding back and forth on it. A stainless steel filament, strung across the VIP serves to substantially reduce and/or minimize transfer of heat by thermal conduction to the vertical supports. The tensile filaments can also have stops in an example to localize the position of the bead on the filament. The magnetic material used to make the bead in an example comprises a relatively low and/or as low as possible of a curie point, for example, to substantially reduce and/or minimize heat loss by black body radiation. Metglas sells an exemplary magnetic material with a Curie point of 225° C. (e.g., magnetic alloy 2714A, cobalt based).

The upper pressure range for a VIP can be estimated using the following equation (18), where $\kappa_{gas}$, is the thermal conductivity of gas, $\beta'$ is a constant approximately equal to 1, and $\lambda$, is the mean free path in the gas, and is given by equation 19.

$$Q_{gas} = \kappa_{gas} * A_{panel} * \frac{\Delta T}{H\_edge + 2 * \beta' * \lambda} \quad (18)$$

$$\lambda(mm) \cong \frac{6.6}{P(Pa)} \cong \frac{0.050}{P(torr)} \quad (19)$$

The thermal conductivity of air is ~0.025 W/(m*K). If the thickness of the insulating gap (H_edge) is ~0.5 inches (13 mm) than in order to reduce the thermal conductivity a factor of 300 the pressure inside the VIP should be $2.6*10^{-5}$ torr. If the space between the VIP surfaces is filled with black body shields separated by ~1 mm the pressure needs to reduced to $3.3*10^{-4}$ torr. If the VIP is filled with Hydrogen or Helium the pressure requirements are lower.

A magnetic field generated external to the VIP can move a magnetic bead supported on a thermally insulating filament back and forth. Since the magnetic field will also attract the bead there will be a frictional force from the bead motion. The friction will lead to a temperature rise in the magnetic bead until it reaches approximately the Curie point. The cool down rate of the magnetic bead will increase with pressure inside the VIP.

An exemplary VIP may be designed to operate over a well defined temperature range where the components can support atmospheric pressure and/or maintain vacuum integrity. Inexpensive maximum and minimum temperature sensors in an example can be placed inside the VIP on both the upper and lower support plates, for example, to evaluate if these temperature extremes have been exceeded.

An exemplary implementation of a maximum temperature sensor may support an object or objects with wax that will melt when the maximum VIP temperature is exceeded. An exemplary implementation of an extreme temperature sensor may support an object on a silica bridge that will fracture when the bridge's base supports expand or contract significantly more than the bridge itself. Silica has a very small thermal expansion coefficient of $\sim 5*10^{-7}/°$ C. while stainless steel has a thermal expansion coefficient of $1-2*10^{-5}/°$ C. If there are loose objects inside the VIP in an example then the temperature extremes have been exceeded. Selecting objects with different mass and or different travel range can distinguish if the maximum or minimum or both temperatures have been exceeded.

VIP cells in an example can be incorporated into clothing to protect people from extreme temperatures in air or liquid. A double layer of VIP cells will allow flexibility for motion, with one layer of cells attached to the outside of an inner elastic garment and a second layer of VIP cells attached to the inside of an outer elastic garment. Each cell in an example is attached at its central point. In an exemplary position of the garment the two cell layers will be staggered (cell edges will have minimal overlap) to block heat conduction through the garment. In exemplary situations where breathability is desired a larger gap between cells and an appropriate elastic fabric in an example allows moisture permeability through the garment while maintaining a high R value. PTFE and polyester coated Kevlar threads in an example serve to improve VIP performance in cells, for example, subjected to high mechanical stress. This is helpful, for example, when personnel are to be immersed in very cold water for extended periods of time.

To thermally insulate materials in an example vacuum bubbles are created, for example, out of blow molded polymer that is sealed with a thin layer of Au. A safety tensile element 110 may be located below other tensile elements 110.

An exemplary approach inexpensively and thoroughly insulates new construction as well as existing buildings. An exemplary approach protects people in hazardous situations and provides critical thermal insulation to protect perishable items, etc. An exemplary approach is also applicable to high and low temperature insulation situations, and with minimal flammability. An exemplary approach offers performance superior to existing vacuum insulating panels.

In an example, an apparatus comprises an upper support plate of a vacuum insulation panel; a lower support plate of the vacuum insulation panel, wherein the upper support plate and the lower support plate are separated by a number of vertical supports; and a plurality of thermally insulating filaments of the vacuum insulation panel. In an example, the number of vertical supports comprises an upper vertical support and a lower vertical support, wherein the upper and lower vertical supports are attached to the upper and lower support plates.

In an example, a process comprises a step of deforming a plurality of base plates for a vacuum insulation panel to create an array of vertical supports for the vacuum insulation panel.

An exemplary implementation a vacuum insulation panel (VIP) comprises first and second walls and a plurality of tensile elements. The first and second walls are structurally coupled to allow formation of a vacuum cavity between the first and second walls. The plurality of tensile elements structurally supports the first and second walls against external pressure contemporaneous with tension on the plurality of tensile elements. The plurality of tensile elements is located in the vacuum cavity between the first and second walls.

The plurality of tensile elements comprises a meshed arrangement of tensile elements at an intermediate location between the first and second walls. A plurality of first supports extends from the first wall and into the vacuum cavity to engage the meshed arrangement of tensile elements. A plurality of second supports extends from the second wall and into the vacuum cavity to engage the meshed arrangement of tensile elements.

The first and second walls comprise first and second transparent walls. The meshed arrangement of tensile elements comprises a meshed filament arrangement at the intermediate location between the first and second transparent walls. The plurality of first supports comprises a plurality of first transparent supports that extends from the first transparent wall and into the vacuum cavity to engage the meshed filament arrangement. The plurality of second supports comprises a plurality of second transparent supports that extends from the second transparent wall and into the vacuum cavity to engage the meshed filament arrangement. The first and second transparent walls, the meshed filament arrangement, the plurality of first transparent supports, and the plurality of second transparent supports cooperate to allow the VIP to serve as a substantially optically-transparent double-paned window.

The meshed arrangement of tensile elements comprises a plurality of openings. A plurality of black body emissivity shields substantially suppresses transmission of electromagnetic radiation between the first and second walls. The plurality of black body emissivity shields is located in the plurality of openings, wherein the plurality of black body emissivity shields comprises one or more discontinuities that prevent direct thermal conduction between the first and second walls through the plurality of black body emissivity shields.

The plurality of tensile elements comprises a plurality of thermal-impedance tensile elements that serves to impede direct thermal conduction through the vacuum cavity between the first and second walls.

The plurality of tensile elements comprises an arrangement of fibers that comprises an approximate ratio of ultimate tensile strength to thermal conductivity inclusively between 3 GPa to 0.04 W/m*oK (or 7.5*1010 s*oK/m2) and 0.1 MPa to 0.025 W/m*oK (or 4.0*106 s*oK/m2) contemporaneous with an approximate temperature in the vacuum cavity of 150 degrees Celsius or lower. The arrangement of fibers structurally supports the first and second walls against external pressure contemporaneous with tension on the arrangement of fibers and contemporaneous with an approximate temperature in the vacuum cavity of 150 degrees Celsius or lower.

The plurality of tensile elements comprises an arrangement of glass or ceramic fibers that comprises an approximate ratio of ultimate tensile strength to thermal conductivity inclusively between 4.89 GPa to 1.1 W/m*oK (or 4.4*109 s*oK/m2) and 0.1 MPa to 0.025 W/m*oK (or 4.0*106 s*oK/m2). The arrangement of glass or ceramic fibers structurally supports the first and second walls against external pressure contemporaneous with tension on the arrangement of glass or ceramic fibers and contemporaneous with an approximate maximum temperature in the vacuum cavity inclusively between 150 degrees Celsius to 1000 degrees Celsius.

The plurality of tensile elements comprises an arrangement of metal fibers or wires that comprises an approximate ratio of ultimate tensile strength to thermal conductivity inclusively between 1.5 GPa to 6.2 W/m*oK (or 2.4*108 s*oK/m2) and 0.1 MPa to 0.025 W/m*oK (or 4.0*106 s*oK/m2). The arrangement of metal fibers or wires structurally supports the first and second walls against external pressure contemporaneous with tension on the arrangement of metal fibers or wires and contemporaneous with an approximate temperature in the vacuum cavity of 1000 degrees Celsius or higher.

The plurality of tensile elements comprises a plurality of thermally insulating filaments at an intermediate location between the first and second walls. The plurality of thermally insulating filaments comprises a first thermally insulating filament and a second thermally insulating filament. A plurality of interlocking pairs of supports comprises a first pair that comprises a first support structurally coupled with the first wall and a second support structurally coupled with the second wall. A plurality of interconnectors comprises a first interconnector and a second interconnector. A heat flow path proceeds in succession from the first wall and along the first support, the first thermally insulating filament, the first interconnector, the second interconnector, the second thermally insulating filament, and the second support to the second wall.

The VIP comprises a VIP cell, A plurality of VIP cells comprises the VIP cell and additional VIP cells. Incorporation of the plurality of VIP cells into clothing serves to protect a user from extreme temperatures in ambient air or liquid.

An exemplary approach comprises structurally coupling first and second vacuum insulation panel (VIP) walls by one or more metal or glass edges to form a vacuum cavity between the first and second VIP walls. Where the one or more metal or glass edges comprise one or more metal edges, there is limiting of an approximate thickness of the one or more metal edges to four micrometers or less. Where the one or more metal or glass edges comprise one or more glass edges, there is limiting of an approximate thickness of the one or more glass edges to forty micrometers or less.

There may be limiting of the approximate thickness of the one or more metal or glass edges to one micrometer or less. There may be forming of the one or more metal or glass edges by distributed physical vapor deposition (PVD). There may be forming of the one or more metal or glass edges by localized superplastic deformation.

There may be stiffening of the one or more metal or glass edges with support rings that are directly coupled the first and/or second VIP walls to promote a reduction in heat flow. There may be coating of the one or more metal or glass edges with a polymer to protect the one or more metal or glass edges. There may be specifying of a product of thermal conductivity and the approximate thickness of the one or more metal edges to comprise less than four micrometers*15 W/m*K or 6*10^-5 W/K.

An exemplary implementation a vacuum insulation panel (VIP) comprises first and second walls that are structurally coupled to allow formation of a vacuum cavity between the first and second walls; and an integrated sensor.

The integrated sensor is located in the vacuum cavity between the first and second walls. A stainless steel filament supported by a plurality of supports extends from the first or second wall and into the vacuum cavity. The integrated sensor comprises a magnetic bead slidably coupled with the stainless steel filament. The magnetic bead serves as a pressure sensor. The integrated sensor comprises one or more of a maximum temperature sensor and a minimum temperature sensor.

An exemplary implementation a vacuum insulation panel (VIP) comprises first and second walls that are structurally coupled to allow formation of a vacuum cavity between the first and second walls; and a cross-sectionally corrugated support between the first and second walls.

The cross-sectionally corrugated support comprises a corrugated support spacer. A plurality of corrugated support spacers is located between the first and second walls. The cross-sectionally corrugated support comprises a corrugated compressive column. A plurality of corrugated compressive columns is located between the first and second walls.

An implementation of the apparatus such as the VIP 100 in an example comprises a plurality of components such as one or more of electronic components, chemical components, mechanical components, and/or hardware components. A number of such components can be combined or divided in an implementation of the VIP 100. In one or more exemplary implementations, one or more features described herein in connection with one or more components and/or one or more parts thereof are applicable and/or extendible analogously to one or more other instances of the particular component and/or other components in the VIP 100. In one or more exemplary implementations, one or more features described herein in connection with one or more components and/or one or more parts thereof may be omitted from or modified in one or more other instances of the particular component and/or other components in the VIP 100. An exemplary technical effect is one or more exemplary and/or desirable functions, approaches, and/or procedures. An implementation of the VIP 100 in an example comprises any (e.g., horizontal, oblique, or vertical) orientation, with the description and figures herein illustrating an exemplary orientation of an exemplary implementation of the VIP 100, for explanatory purposes.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A vacuum insulation panel (VIP), comprising:
   first and second walls that are structurally coupled to allow formation of a vacuum cavity between the first and second walls, wherein the first wall comprises a first plurality of pillars aligned in a first general direction, wherein the second wall comprises a second plurality of pillars aligned in a second general direction;
   a first plurality of tensile elements that comprises fibers;
   a second plurality of tensile elements that comprises fibers; and
   a plurality of interlocking pairs of interconnectors;
   wherein the second plurality of tensile elements directly touches only the second plurality of pillars and the plurality of interlocking pairs of interconnectors, wherein the first plurality of tensile elements directly touches only the first plurality of pillars and the plurality of interlocking pairs of interconnectors, wherein the first plurality of tensile elements comprises a first plurality of thermally insulating filaments and the second plurality of tensile elements comprises a second plurality of thermally insulating filaments at an intermediate location between the first and second walls;

wherein a heat flow path proceeds from the first wall and subsequently along a pillar of the first plurality of pillars, a thermally insulating filament of the first plurality of thermally insulating filaments, a thermally insulating filament of the second plurality of thermally insulating filaments, and a pillar of the second plurality of pillars to the second wall;

wherein the first and second pluralities of tensile elements serve to structurally support the first and second walls against external pressure contemporaneous with tension on the first and second pluralities of tensile elements, wherein the first and second pluralities of tensile elements and the first and second pluralities of pillars are located in the vacuum cavity between the first and second walls.

2. The VIP of claim 1, wherein the plurality of interlocking pairs of interconnectors comprises a plurality of interlocking pairs of corresponding first and second pluralities of interconnectors;

wherein the heat flow path proceeds from the first wall and subsequently along the pillar of the first plurality of pillars, the thermally insulating filament of the first plurality of thermally insulating filaments, an interconnector of the first plurality of interconnectors, an interconnector of the second plurality of interconnectors, the thermally insulating filament of the second plurality of thermally insulating filaments, and the pillar of the second plurality of pillars to the second wall.

3. The VIP of claim 1, wherein the first and second pluralities of tensile elements, through connection with the respective first and second pluralities of pillars and corresponding plurality of interlocking pairs of interconctors, comprise an interlocked arrangement of tensile elements at an intermediate location between the first and second walls, wherein the first plurality of pillars extends from the first wall and into the vacuum cavity to engage the interlocked arrangement of tensile elements, wherein the second plurality of pillars extends from the second wall and into the vacuum cavity to engage the interlocked arrangement of tensile elements.

4. The VIP of claim 3, wherein the first and second walls comprise first and second transparent walls, wherein the interlocked arrangement of tensile elements comprises an interlocked filament arrangement at the intermediate location between the first and second transparent walls;

wherein the first plurality of pillars comprises a plurality of first transparent supports that extends from the first transparent wall and into the vacuum cavity to engage the interlocked filament arrangement;

wherein the second plurality of pillars comprises a plurality of second transparent supports that extends from the second transparent wall and into the vacuum cavity to engage the interlocked filament arrangement;

wherein the first and second transparent walls, the interlocked filament arrangement, the plurality of first transparent supports, and the plurality of second transparent supports cooperate to allow the VIP to serve as an optically-transparent double-paned window.

5. The VIP of claim 3, wherein the interlocked arrangement of tensile elements comprises a plurality of openings, the VIP further comprising:

a plurality of black body emissivity shields that serve to promote suppression of transmission of electromagnetic radiation between the first and second walls, wherein the plurality of black body emissivity shields blocks electromagnetic radiation between the first and second walls in the plurality of openings of the interlocked arrangement of tensile elements, wherein the plurality of black body emissivity shields comprises one or more discontinuities that serve to promote prevention of direct thermal conduction between the first and second walls through the plurality of black body emissivity shields.

6. The VIP of claim 1, wherein the first and second pluralities of tensile elements comprise a plurality of thermal-impedance tensile elements that serves to impede direct thermal conduction through the vacuum cavity between the first and second walls.

7. The VIP of claim 6, wherein the plurality of thermal-impedance tensile elements, through connection with the respective first and second pluralities of pillars and corresponding plurality of interlocking pairs of interconnectors, comprises an interlocked arrangement of thermal-impedance tensile elements at an intermediate location between the first and second walls that serve as thermal impedances, wherein the plurality of thermal-impedance tensile elements in tension by virtue of the interlocked arrangement of thermal-impedance tensile elements serves to keep the first and second walls from the intermediate location for the interlocked arrangement.

8. The VIP of claim 1, wherein the first and second pluralities of tensile elements, through connection with the respective first and second pluralities of pillars and corresponding plurality of interlocking pairs of interconnectors comprise an arrangement of fibers that comprises an approximate ratio of ultimate tensile strength to thermal conductivity inclusively between 3 GPa to 0.04 W/m*.degree. K (or $7.5*10^{10}$ s*.degree. K/m$^2$) and 0.1 MPa to 0.025 W/m*.degree. K (or $4.0*10^6$ s*.degree. K/m$^2$) in relation to an approximate temperature contemporaneous in the vacuum cavity of 150 degrees Celsius or lower, wherein the arrangement of fibers structurally supports the first and second walls against external pressure contemporaneous with tension on the arrangement of fibers and in relation to an approximate temperature contemporaneous in the vacuum cavity of 150 degrees Celsius or lower.

9. The VIP of claim 1, wherein the first and second pluralities of tensile elements, through connection with the respective first and second pluralities of pillars and corresponding plurality of interlocking pairs of interconnectors, comprise an arrangement of glass or ceramic fibers that comprises an approximate ratio of ultimate tensile strength to thermal conductivity inclusively between 4.89 GPa to 1.1 W/m*.degree. K (or $4.4*10^9$ s*.degree. K/m$^2$) and 0.1 MPa to 0.025 W/m*.degree. K (or $4.0*10^6$ s*.degree. K/m$^2$), wherein the arrangement of glass or ceramic fibers structurally supports the first and second walls against external pressure contemporaneous with tension on the arrangement of glass or ceramic fibers and in relation to an approximate maximum temperature contemporaneous in the vacuum cavity inclusively between 150 degrees Celsius to 1000 degrees Celsius.

10. The VIP of claim 1, wherein the first and second pluralities of tensile elements, through connection with the respective first and second pluralities of pillars and corresponding plurality of interlocking pairs of interconnectors, comprise an arrangement of metal fibers or wires that comprises an approximate ratio of ultimate tensile strength to thermal conductivity inclusively between 1.5 GPa to 6.2 W/m*.degree. K (or 2.4*10.sup.8 s*.degree. K/m.sup.2) and 0.1 MPa to 0.025 W/m*.degree. K (or 4.0*10.sup.6 s*.degree. K/m.sup.2), wherein the arrangement of metal fibers or wires structurally supports the first and second walls against external pressure contemporaneous with tension on the arrangement of metal fibers or wires and in relation to an approximate temperature contemporaneous in the vacuum cavity of 1000 degrees Celsius or higher.

11. The VIP of claim 1 and additional VIPs incorporated into clothing;
   wherein incorporation of the VIP and the additional VIPs into the clothing serves to protect a user from temperatures that are extreme relative to an unprotected person in ambient air or liquid.

12. The VIP of claim 1, wherein the first and second plurality of pillars comprise an array of periodic support locations that directly touch the first and second pluralities of tensile elements.

13. The VIP of claim 1, wherein the first plurality of pillars of the first wall are aligned as a plurality of columns in the first general direction, wherein the second plurality of pillars of the second wall are aligned as a plurality of rows in the second general direction.

14. The VIP of claim 1, wherein the first plurality of pillars extends toward the second wall, wherein the second plurality of pillars extends toward the first wall.

15. The VIP of claim 1, wherein the first and second walls comprise first and second planar walls.

16. The VIP of claim 1, wherein the first and second pluralities of tensile elements, through connection with the respective first and second pluralities of pillars and corresponding plurality of interlocking pairs of interconnectors, comprise an arrangement of aramid fibers that comprises an approximate ratio of ultimate tensile strength to thermal conductivity inclusively between 3 GPa to 0.04 W/m*.degree. K (or 7.5*10.sup.10 s*.degree. K/m.sup.2) and 0.1 MPa to 0.025 W/m*.degree. K (or 4.0*10.sup.6 s*.degree. K/m.sup.2) in relation to an approximate temperature contemporaneous in the vacuum cavity of 150 degrees Celsius or lower, wherein the arrangement of aramid fibers structurally supports the first and second walls against external pressure contemporaneous with tension on the arrangement of aramid fibers and in relation to an approximate temperature contemporaneous in the vacuum cavity of 150 degrees Celsius or lower.

17. The VIP of claim 1, wherein the first and second pluralities of tensile elements, through connection with the respective first and second pluralities of pillars and corresponding plurality of interlocking pairs of interconnectors, comprise an arrangement of stainless steel or titanium alloy fibers or wires that comprises an approximate ratio of ultimate tensile strength to thermal conductivity inclusively between 1.5 GPa to 6.2 W/m*.degree. K (or 2.4*10.sup.8 s*.degree. K/m.sup.2) and 0.1 MPa to 0.025 W/m*.degree. K (or 4.0*10.sup.6 s*.degree. K/m.sup.2), wherein the arrangement of stainless steel or titanium alloy fibers or wires structurally supports the first and second walls against external pressure contemporaneous with tension on the arrangement of stainless steel or titanium alloy fibers or wires and in relation to an approximate temperature contemporaneous in the vacuum cavity of 1000 degrees Celsius or higher.

18. A vacuum insulation panel (VIP), comprising:
   first and second planar walls that are structurally coupled to allow formation of a vacuum cavity between the first and second planar walls, wherein the first planar wall comprises a first plurality of pillars aligned in a first general direction, wherein the second planar wall comprises a second plurality of pillars aligned in a second general direction;
   a first plurality of tensile elements that comprises fibers;
   a second plurality of tensile elements that comprises fibers; and
   a plurality of interlocking pairs of interconnectors;
   wherein the second plurality of tensile elements directly touches only the second plurality of pillars and the plurality of interlocking pairs interconnectors, wherein the first plurality of tensile elements directly touches only the first plurality of pillars and the plurality of interlocking pairs of interconnectors, wherein the first plurality of tensile elements comprises a first plurality of thermally insulating filaments and the second plurality of tensile elements comprises a second plurality of thermally insulating filaments at an intermediate location between the first and second planar walls;
   wherein a heat flow path proceeds from the first planar wall and subsequently along a pillar of the first plurality of pillars, a thermally insulating filament of the first plurality of thermally insulating filaments, a thermally insulating filament of the second plurality of thermally insulating filaments, and a pillar of the second plurality of pillars to the second planar wall;
   wherein the first and second pluralities of tensile elements serve to structurally support the first and second planar walls against external pressure contemporaneous with tension on the first and second pluralities of tensile elements, wherein the first and second pluralities of tensile elements and the first and second pluralities of pillars are located in the vacuum cavity between the first and second planar walls.

19. A process, comprising the steps of:
structurally coupling first and second walls of a vacuum insulation panel (VIP) to allow formation of a vacuum cavity between the first and second walls, wherein the first wall comprises a first plurality of pillars aligned in a first general direction, wherein the second wall comprises a second plurality of pillars aligned in a second general direction;
coupling a first plurality and a second plurality of tensile elements with the first and second pluralities of pillars and a plurality of interlocking pairs of interconnectors to structurally support the first and second walls against external pressure contemporaneous with tension on the first and second pluralities of tensile elements, wherein the first and second pluralities of tensile elements and the first and second pluralities of pillars are located in the vacuum cavity between the first and second walls;
wherein the first plurality of tensile elements directly touches only the first plurality of pillars and the plurality of interlocking pairs of interconnectors, wherein the first plurality of tensile elements comprises fibers, wherein the second plurality of tensile elements directly touches only the second plurality of pillars and the plurality of interlocking pairs of interconnectors, wherein the second plurality of tensile elements comprises fibers, wherein the first plurality of tensile elements comprises a first plurality of thermally insulating filaments and the second plurality of tensile elements comprises a second plurality of thermally insulating filaments at an intermediate location between the first and second planar walls;
wherein a heat flow path proceeds from the first wall and subsequently along a pillar of the first plurality of pillars, a thermally insulating filament of the first plurality of thermally insulating filaments, an interconnector of the first interconnectors, an interconnector of the second plurality of interconnectors, a thermally insulating filament of the second plurality of thermally insulating filaments, and a pillar of the second plurality of pillars to the second wall.

20. The process of claim 19, wherein the first and second pluralities of tensile elements, through connection with the respective first and second pluralities of pillars and corresponding plurality of interlocking pairs of interconnectors, comprise an interlocked arrangement of tensile elements, wherein the step of coupling the first and second pluralities of tensile elements with the first and second pluralities of pillars and the plurality of interlocking pairs of interconnectors to structurally support the first and second walls against external pressure contemporaneous with tension on the first and second pluralities of tensile elements comprises the step of:

locating an interlocked arrangement of tensile elements, as one or more of the first and second pluralities of tensile elements, at an intermediate location between the first and second walls, wherein the first plurality of pillars extends from the first wall and into the vacuum cavity to engage the interlocked arrangement of tensile elements, wherein the second plurality of pillars extends from the second wall and into the vacuum cavity to engage the interlocked arrangement of tensile elements.

21. The process of claim 20, wherein the first and second walls comprise first and second transparent walls, wherein the interlocked arrangement of tensile elements comprises an interlocked filament arrangement at the intermediate location between the first and second transparent walls;

wherein the first plurality of pillars comprises a plurality of first transparent supports that extends from the first transparent wall and into the vacuum cavity to engage the interlocked filament arrangement;

wherein the second plurality of pillars comprises a plurality of second transparent supports that extends from the second transparent wall and into the vacuum cavity to engage the interlocked filament arrangement;

wherein the step of structurally coupling the first and second walls of the VIP to allow formation of the vacuum cavity between the first and second walls and the step of coupling the first and second pluralities of tensile elements with the first and second pluralities of pillars and the plurality of interlocked pairs of interconnectors to structurally support the first and second walls against external pressure contemporaneous with tension on the first and second pluralities of tensile elements comprise the step of:

employing the first and second transparent walls, the interlocked filament arrangement, the plurality of first transparent supports, and the plurality of second transparent supports to allow the VIP to serve as an optically-transparent double-paned window.

22. The process of claim 20, wherein the interlocked arrangement of tensile elements comprises a plurality of openings, further comprising the step of:

employing a plurality of black body emissivity shields that serve to promote suppression of transmission of electromagnetic radiation between the first and second walls, wherein the plurality of black body emissivity shields blocks electromagnetic radiation between the first and second walls in the plurality of openings of the interlocked arrangement of tensile elements, wherein the plurality of black body emissivity shields comprises one or more discontinuities that serve to promote prevention of direct thermal conduction between the first and second walls through the plurality of black body emissivity shields.

* * * * *